United States Patent [19]
Otto et al.

[11] Patent Number: 5,624,276
[45] Date of Patent: Apr. 29, 1997

[54] SECURING AND CONTACTING ADAPTER FOR A CONNECTOR BLOCK

[75] Inventors: Hans-Dieter Otto, Wipperfürth; Norbert Gaertner; Helmut Schlafhorst, both of Wuppertal; Frank Kaufhold, Schwerte, all of Germany

[73] Assignee: Quante Aktiengesellschaft, Germany

[21] Appl. No.: 447,963

[22] Filed: May 23, 1995

[30] Foreign Application Priority Data

Aug. 17, 1994 [DE] Germany .................... 9413265 U

[51] Int. Cl.⁶ .................................................. H01R 9/26
[52] U.S. Cl. .................... 439/532; 439/121; 439/717
[58] Field of Search .................... 439/94, 121, 532, 439/622, 717

[56] References Cited

U.S. PATENT DOCUMENTS

| | | | |
|---|---|---|---|
| 3,439,313 | 4/1969 | Fischer et al. | 439/532 |
| 4,792,311 | 12/1988 | Wu | 439/622 |
| 4,840,572 | 6/1989 | DeLuca et al. | 439/717 |
| 4,959,025 | 9/1990 | Eberhard et al. | 439/622 |
| 5,154,642 | 10/1992 | Chung-Yin | 439/622 |
| 5,356,309 | 10/1994 | Carney et al. | 439/532 |

FOREIGN PATENT DOCUMENTS

| | | |
|---|---|---|
| 0304393B1 | 1/1994 | European Pat. Off. . |
| 3345803 | 2/1986 | Germany . |
| 9102615.6 | 7/1991 | Germany . |
| 4216422 | 11/1993 | Germany . |
| 9402908.3 | 6/1994 | Germany . |

*Primary Examiner*—Gary E. Elkins
*Attorney, Agent, or Firm*—Finnegan, Henderson, Farabow, Garrett & Dunner, L.L.P.

[57] ABSTRACT

A securing and contacting adapter. (2) for a connector block in telecommunication technology having a front-sided engaging means consists of an elastic, electrically conducting material and has a first contacting and securing section (10) as well as a second contacting and securing section (14). The first contacting and securing section (10) has a securing element (12) for producing a releasable connection with the connector block, the securing element (12) being arranged at a distance from the upper end of the first contacting and securing section (10). The second contacting and securing section (14) is provided with a securing element (20) to produce a releasable connection with a receiving arm of a carrier profile rail.

13 Claims, 2 Drawing Sheets

SECURING AND CONTACTING ADAPTER FOR A CONNECTOR BLOCK

The present invention relates to a securing and contacting adapter for a connector block in telecommunication technology which has a front-sided engaging means.

In telecommunication technology, connector blocks are used for the termination and plugging of cables and leads in distribution cabinets, distribution boxes, wall distributors, main distribution frames and similar devices. These devices have securing apparatus for the connector blocks in which these are engageable for quick assembly. As shown in FIG. 4 relating to the state of the art, connector blocks 4 are known with openings 6 respectively arranged at the front side in which engaging means 8 are located for engaged attachment to tongues 36 of a carrier profile 34. According to the illustration in FIG. 4, the engaging means 8 of the connector blocks 4 engage into a recess 38 spaced from the upper end of the tongue 36 of the carrier profile 34. The section of the tongue 36 of the carrier profile 34 projecting above the engaging means 8 in the opening 6 of the connector block 4 serves for electrically contacting overvoltage protection means, not shown.

A securing apparatus with the trade name "Flexi-Rail" is known from G 94 02 908.3 for the parallel arrangement of connector blocks of telecommunications technology in distribution cabinets and boxes, wall distribution frames and main distribution frames and consists of two spaced asymmetric carrier profile rails with at least one holding part. The cross section of the asymmetric profile rails is formed in such a manner that it has a receiving arm and an undercut for engaging a specially designed connector block.

The invention is based on the technical problem of providing a simple and effective securing and contacting adapter for connector blocks of telecommunications technology which allows different connector blocks to be engaged in a simple manner both onto a known, conventional carrier profile as well as onto spaced carrier profile rails with a specific predetermined profile cross section, an earth connection of the over-voltage protection means associated with the connector blocks being guaranteed without the requirement of a structural alteration of the connector blocks themselves.

This object is solved by a securing and contacting adapter for a connector block of telecommunication technology having a front-sided engaging means, said adapter consisting of an elastic, electrically conducting material and comprising a first contacting and securing section which is provided with a securing element for producing a releasable connection with the front-sided engaging means of the connector block, the securing element being arranged at a distance from the upper end of the contacting and securing section, and a second contacting and securing section which is provided with a securing element to produce a releasable connection with a receiving arm of a carrier profile rail.

The securing and contacting adapter according to the invention makes it possible in an advantageous manner to use existing connector blocks of telecommunication technology, without any structural alteration both of conventional carrier profiles as well as of spaced carrier profile rails, for example of the Flexi-Rail type according to G 94 02 908.3, with a specific predetermined profile cross section. In this case, an earth connection of the over-voltage devices associated with the contact rails is ensured. The mounting of the securing and contacting adapter according to the invention to a connector bar as well as the securing of the connector bar to spaced carrier profile rails can be carried out without any tools whatsoever. The same applies to dismounting.

In a particularly advantageous embodiment variation, the securing and contacting adapter is integrally formed and can therefore be very simply and cost-effectively produced.

If the first contacting and securing section of the adapter according to the invention is substantially of a plate-like shape, the adapter can be particularly easily inserted into and guided in the openings provided at the respective front sides of the connector bars. In this context, it has also proved to be advantageous to taper the upper end of the first contacting and securing section.

It has also proved to be advantageous to form the second contacting and securing section such that it is substantially fork-shaped and corresponds to the receiving arm of the carrier profile rail. In this manner, the securing and contacting adapter according to the invention can be particularly easily guided and placed onto the receiving arm of the carrier profile rail and produce an electrical contact.

If the arms of the fork-shaped second contacting and securing section have different dimensions and/or shapes, the second contacting and securing section can easily be adapted to the specific shape of a selected carrier profile rail and a reliable attachment and contact can be achieved.

It is also advantageous that the securing element of the first contacting and securing section is a recess, wherein it has proved to be particularly useful that the recess has an substantially rectangular shape. On account of these measures, an uncomplicated, effective and releasable connection may be produced with the engaging means of the connector block.

A further advantageous embodiment of the securing and contacting adapter according to the invention provides that the securing element of the fork-shaped second contacting and securing section is a projection on one of the fork-shaped arms which matches with one of the engaging means of the carrier profile rail. This makes it possible to securely fix a connector block provided with inventive securing and contacting adapters onto spaced carrier profile rails. The possibility is provided in this case to move the connector block on the carrier profile rails.

If one arm of the fork-shaped second contacting and securing section is provided with a gripping element, the connector block can be removed from the carrier profile rails in a particularly simple manner without tools. Additionally, it has proved to be beneficial that one arm of the fork-shaped second contacting and securing section has an inclined guiding section. This simplifies the placing of the connector block with the associated inventive securing and contacting adapters onto spaced carrier profile rails and additionally allows an adaptation of the adapter shape to the specific cross-sectional shape Of a carrier profile rail. Simultaneously, the guiding section can coact resiliently with the fork arms of the second contacting and securing section.

It has additionally proved to be useful for the fixing of the inventive securing and contacting adapter in the connector block that the second contacting and securing section is widened with a foot-like shape with respect to the first contacting and securing section. In this manner, upon insertion of the securing and contacting adapter into the openings located at the front sides of the connector block, a stop is created which exactly fixes the relative position between the adapter and the connector block. This measure can also be enhanced by the fork-shaped second contacting and securing section.

An exemplary embodiment of the securing and contacting adapter according to the invention is described in the following by way of further details and advantageous embodiments with reference to the drawings, in which.

Figure 1:
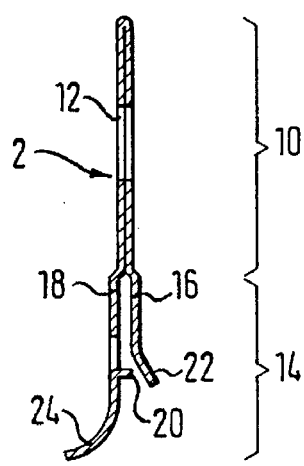
FIG. 1 shows a cross section of the securing and contacting adapter according to the invention.

An exemplary embodiment of the securing and contacting adapter 2 according to the invention is shown in cross section in FIG. 1. In the following description, the securing and contacting adapter 2 is denoted adapter 2. The adapter 2 is made from an elastic, electrically conductive material such as a suitable metallic material. As can be recognized in the drawing, the adapter 2 includes an upper first contacting and securing section 10 and a lower second contacting and securing section 14 which is essentially fork-shaped with the two fork arms 16 and 18.

In the first contacting and securing section 10 at a distance from its upper end there is provided a recess 12. In the present case, this recess 12 is a through-opening.

It may also be seen in FIG. 1 that the arms 16, 18 of the fork-shaped second contacting and securing section 14 have different dimensions and different shapes, the arm 16 being shorter than the arm 18. The arm 18 of the fork-shaped second contacting and securing section 14 is provided with a gripping element 24 which is formed by a rounded bend of the lower arm end. The lower end of the shorter arm 16 is also slightly bent and forms a guiding section 22.

A projection 20 is provided on the arm 18 of the fork-shaped second contacting and securing section 14 and projects in the area of the guiding section 22 of the arm 16 into the space formed between the arms 16 and 18.

Figure 2:
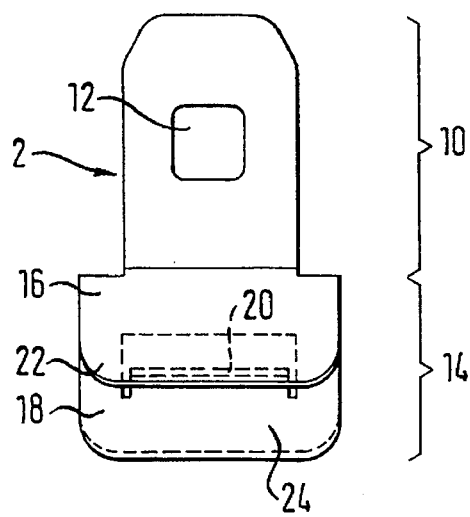
FIG. 2 shows a front view of the inventive securing and contacting adapter.

Further details of the inventive adapter 2 can be recognized in FIG. 2. It may be seen that the first contacting and securing section 10 of the adapter 2 has a substantially plate-like shape. In the present embodiment of the adapter 2, the upper end of the first contacting and securing section 10 is tapered to the sides, which simplifies the insertion of the adapter 2 into a connector block. It may be also recognized in FIG. 2 that the recess 12 provided in the first contacting and securing section 10 is substantially rectangular.

The projection 20 provided on the arm 18 in the fork-shaped second contacting and securing section 14 is formed in the present variant of the embodiment by an appropriately angled bend of the arm surface of the arm 18.

Additionally, the second contacting and securing section 14 is widened in a foot-like manner with respect to the first contacting and securing section 10.

The side edges of the arms 16 and 18 are respectively slightly rounded in the region of the guiding section 22 and of the gripping element 24.

The inventive adapter 2 according to the embodiment described above is integrally formed and produced from a plate-shaped basic material which is appropriately stamped, folded, pressed together, bent and brought into the shape illustrated in FIGS. 1 and 2. It is naturally equally conceivable to produce the inventive adapter from several parts and to connect these into the final shape of the adapter by means of a suitable process such as soldering or welding.

Figure 3:
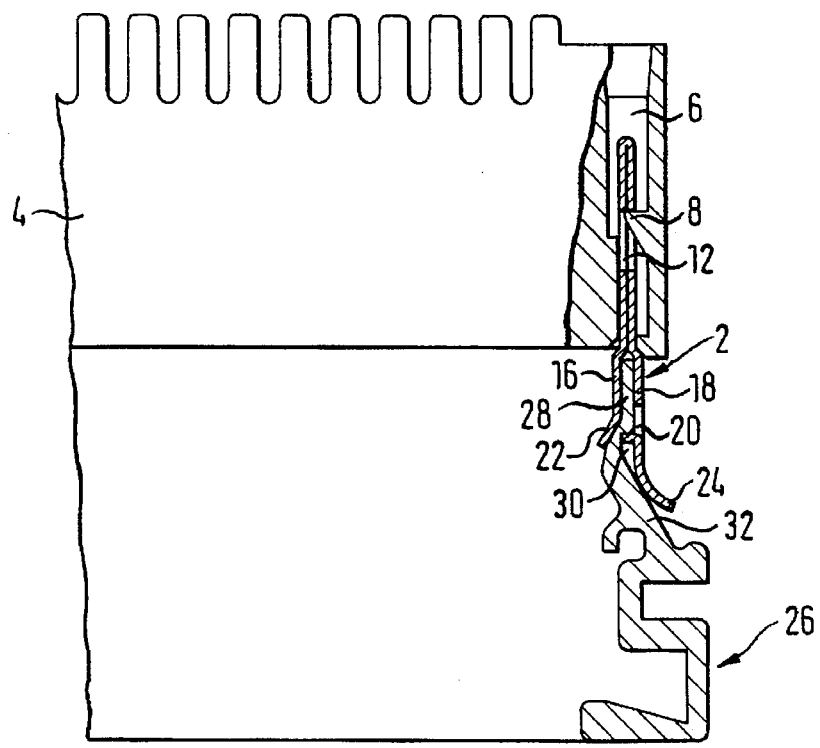
FIG. 3 shows a connector block fixed by means of the inventive securing and contacting adapter onto carrier profile rails.

FIG. 3 schematically shows partially in cross-sectional view a connector block 4 placed by means of the adapter 2 according to the invention onto spaced carrier profile rails 26. As the connector block-carrier profile rails arrangement is symmetrical, only the right-hand half of the arrangement is illustrated in FIG. 3.

The asymmetric carrier profile rail 26 used in the present exemplary embodiment is, for example, known from G 94 02 908.3 and known by the trade name Flexi-Rail. The upper end of the carrier profile rail 26 is formed as a receiving arm 28 with an undercut 30. An inclined, downwardly extending section 32 of the carrier profile rail 26 adjoins the receiving arm 28.

As may be taken from FIG. 3, the adapter 2 according to the invention is inserted by means of its first contacting and securing section 10 into an opening 6 arranged at the front side of the connector block 4. The widening of the second contacting and securing section 14, which is foot-shaped in comparison to the first contacting and securing section 10, and the fork-shaped arms 16 and 18 of the second section act in this case as a stop. The rectangular recess 12 spaced from the upper end of the first contacting and securing section 10 engages in an engaging means 8 of the connector bar 4 projecting into the opening 6 and thus produces a releasable connection with the connector block 4. The free upper end of the first contacting and securing section 10 of the adapter 2 is available for making contact with operative elements such as over-voltage protection devices not shown in the drawings.

The connector block 4 is engaged with the carrier profile rail 26 by means of the fork-shaped second contacting and securing section 14. In this case, the arms 16 and 18 of the fork-shaped second contacting and securing section 14 embrace the receiving arm 28 of the carrier profile rail 26. As may be easily recognized in FIG. 3, the dimensions and arrangement of the projection 20 on the arm 18 of the adapter 2 are selected such that the projection 20 engages behind the under-cut 30 which serves as an engaging means of the receiving arm 28 of the carrier profile rail 26 and thus produces a releasable locked connection with the carrier profile rail 26.

The dimensions and shape of the arms 16 and 18 are appropriately adapted to the shape of the respectively associated areas of the carrier profile rail 26.

The guiding section 22 of the shorter arm 16 of the second contacting and securing section 14 of the adapter 2 lies against an inclined bottom section of the receiving arm 28 of the carrier profile rail 26, and the gripping element 24 of the longer arm 18 lies at the level of and against an inclined area 32 of the carrier profile rail 26. The fork-shaped second contacting and securing section 14 enhances the secure holding of the adapter 2 on the carrier profile rail 26 on account of its resiliently acting arms 16 and 18 and guarantees a reliable electrical contact between the adapter 2 and the carrier profile rail 26.

As illustrated in FIG. 3, the gripping element 24 of the arm 18 is located on a side of the connector block 4 or the carrier profile rail 26 which is accessible to the user. By lightly pulling at the gripping element 24, the engagement of the projection 20 of the arm 18 in the undercut 30 of the carrier profile rail 26 is released and the connector block 4 can be pulled together with the adapter from the carrier profile rail 26. It is apparent from the preceding description that a connector block can be assembled with the aid of the inventive adapter in a simple manner and without tools onto a corresponding carrier profile rail and removed again from this.

Figure 4:
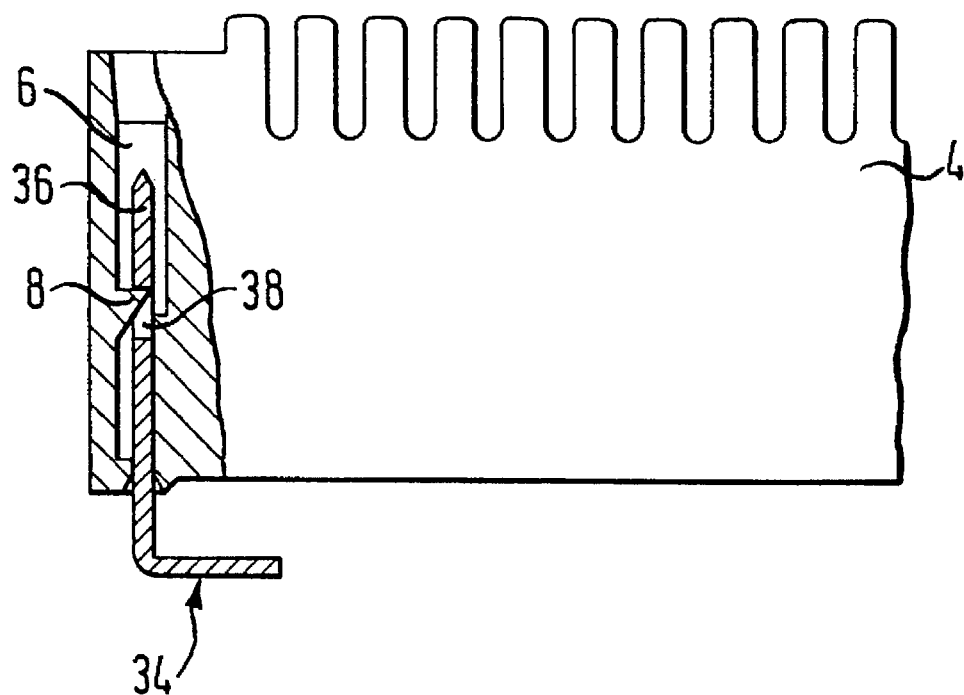
FIG. 4 shows a connector block arranged on a carrier profile according to the state of the art.

Additionally, the adapter 2 according to the invention can be released by lightly elastically bending the upper end of the first contacting and securing section 10 out of engagement with the engaging means 8 of the connector block 4. This allows the use of the connector block 4 in connection with a carrier profile 34 according to the state of the art as illustrated in FIG. 4. It is therefore possible with the aid of the adapter according to the invention to use a connector block, without any structural alteration, both in known carrier profiles as well as in appropriately shaped carrier profile rails.

The adapter described above represents only one of the possible embodiments within the scope of the invention and it is not intended to limit the scope of the invention. It is clear that the shape of the adapter according to the invention can be considerably varied in accordance with the carrier profile rail and the carrier profile used. In particular, the recess in the first contacting and securing section of the adapter which serves as a securing element for producing a releasable connection with a front-sided engaging means of the connector blocks can have a different suitable shape than that described. It is also conceivable that the dimensions and shape of the arms 16 and 18 as well as of the guiding section 22 and the gripping element 24 can be appropriately modified in order to be adapted to a specific carrier profile rail shape which is not inevitably asymmetrical as in the case of the exemplary embodiment described above. Further, the shape and position of the projection 20 functioning as a securing element for producing a releasable connection with a receiving arm of a carrier profile rail can be adapted in an appropriate manner.

Reference sign list

There is denoted by:
2 securing and contacting adapter
4 connector block
6 opening in 4
8 engaging means of 4
10 first contacting and securing section
12 recess in 10
14 second contacting and securing section
16 arm of 14
18 arm of 14
20 projection
22 guiding section
24 gripping element
26 carrier profile rail
28 receiving arm
30 undercut
32 inclined section
34 carrier profile
36 tongue
38 recess

We claim:

1. A securing and contacting adapter for making a releasable connection with a connector block and with a receiving arm of a carrier profile rail in telecommunication apparatus, the receiving arm having an undercut formed therein for connection with said adapter, said adapter being made of an elastic, electrically conducting material and comprising:

a first contacting and securing section having an upper end and provided with a first securing element for making a releasable connection with the connector block, the first securing element being arranged at a predetermined distance from said upper end of the first contacting and securing section, and a second contacting and securing section provided with a second securing element for making a releasable connection with the undercut of the receiving arm of the carrier profile rail.

2. A securing and contacting adapter according to claim 1, which is integrally formed.

3. A securing and contacting adapter according to claim 1, wherein the first contacting and securing section has an essentially flat shape.

4. A securing and contacting adapter according to claim 3 wherein the upper end of the first contacting and securing section is tapered.

5. A securing and contacting adapter according to claim 1, wherein the second contacting and securing section is substantially in the shape of a fork to mate with the receiving arm of the carrier profile rail.

6. A securing and contacting adapter according to claim 1, wherein the second contacting and securing section has a greater width than the first contacting and securing section.

7. A securing and contacting adapter for use with a connector block in telecommunication apparatus, said adapter being made of an elastic, electrically conducting material and comprising:

a first contacting and securing section having an upper end and provided with a first securing element for making a releasable connection with the connector block, the first securing element being arranged at a predetermined distance from said upper end of the first contacting and securing section, and a second contacting and securing section provided with a second securing element for making a releasable connection with a receiving arm of a carrier profile rail, and wherein the second contacting and securing section contains two arms of different lengths.

8. A securing and contacting adapter according to claim 7, wherein the first securing element of the first contacting and securing section is a recess.

9. A securing and contacting adapter according to claim 8, wherein the recess is substantially rectangular.

10. A securing and contacting adapter according to claim 7, wherein the second securing element of the second contacting and securing section is a projection formed on one of the two arms for making said releasable connection with said receiving arm of the carrier profile rail.

11. A securing and contacting adapter according to claim 7, wherein one of the two arms of the second contacting and securing section is provided with a gripping element.

12. A securing and contacting adapter according to claim 11, wherein the other of the two arms of the second contacting and securing section has an inclined guiding section.

13. A securing and contacting adapter for use with a connector block in telecommunication apparatus, said adapter being made of an elastic, electrically conducting material and comprising:

a first contacting and securing section having an essentially flat shape and an upper end and provided with a first securing element in the shape of a recess for making a releasable connection with the connector block, the recess being positioned at a predetermined distance from said upper end of the first contacting and securing section;

a second contacting and securing section substantially in the shape of a fork and shaped to receive a receiving arm of a carrier profile rail and provided with two arms of different lengths and having a second securing element formed as a projection on one of the two arms for making a releasable connection with the receiving arm of the carrier profile rail.

* * * * *